United States Patent [19]

Jucker

[11] 3,817,083
[45] June 18, 1974

[54] DEVICE AND PROCESS FOR MEASURING A CHARACTERISTIC VALUE OF THE OPERATION OF A CLOCKWORK

[75] Inventor: Erich Jucker, La Chaux De Fonds, Switzerland

[73] Assignee: Portescap, La Chaux de Fonds, Switzerland

[22] Filed: Sept. 26, 1972

[21] Appl. No.: 292,413

[30] Foreign Application Priority Data
Sept. 27, 1971  Switzerland................ 14060/71

[52] U.S. Cl. .................................................. 73/6
[51] Int. Cl. .......................................... G04b 17/00
[58] Field of Search ........ 73/6; 81/6; 324/186, 189, 324/191

[56] References Cited
UNITED STATES PATENTS
3,238,764  3/1966  Greiner..................................... 73/6
3,370,456  2/1968  Jucker....................................... 73/6

FOREIGN PATENTS OR APPLICATIONS
1,209,064  1/1966  Germany......................... 324/189

*Primary Examiner*—S. Clement Swisher
*Attorney, Agent, or Firm*—Curtis, Morris & Safford; Arthur V. Smith

[57] ABSTRACT

A vibration detector connected to a clockwork supplies measuring pulses through an electronic logic circuit to a counter. A chronometering pulse generator is also connected through the logic circuit to the counter. A given number of chronometering pulses of constant repetition rate are counted from a predetermined measurement pulse and the duration of the period of time between the last chronometering pulse counted and the following measurement pulse is converted into an electrical value which is graphically posted.

13 Claims, 3 Drawing Figures

DEVICE AND PROCESS FOR MEASURING A CHARACTERISTIC VALUE OF THE OPERATION OF A CLOCKWORK

BACKGROUND OF THE INVENTION

The present invention relates to a process and apparatus for measuring a characteristic value of the operation of a clockwork in which the vibrations produced by the impacts of the escapement of the clockwork are detected and transformed into electrical measurement pulses.

One type of device used to determine the running rate of a watch is called a chronocomparator. In such an apparatus, the measurement pulses are printed in the form of dots or small lines on a recording tape which moves at a uniform speed.

The succession of these dots forms a line which is inclined with respect to the direction of the movement of the tape and this inclination varies with the time interval between the successive pulses. The measurement of the running rate of the clock thus is reduced to a measurement of the inclination of the line formed.

This known method therefore provides a diagram, and it is necessary to go through a subsequent reading operation in order to obtain the quantitative result of the measurement.

SUMMARY OF THE INVENTION

The invention comprises the method and apparatus for counting, in successive measurement intervals, starting from a measurement pulse, a given number of chronometering pulses of constant rate of repetition, converting the duration of the period of time between the last chronometering pulse counted and the following measurement pulse into an electrical value and continuously posting the value of this electrical value.

One preferred embodiment of the invention comprises a vibration detector attached to the clockwork for supplying the measuring pulses and a chronometering pulse generator connected, via a logical circuit, to a pulse counter. A controlled preposting circuit is associated with the counter. A trigger circuit with two inputs and two outputs is also included, one of its inputs being connected to the output of the pulse counter, its other input being connected to the vibration detector, one of its outputs being connected to an input of the logical circuit and its other output controlling the preposting circuit and also being connected via a time-amplitude converter to a posting device.

The object of the present invention is to overcome the drawback of the prior art diagram reading operation and to provide a process of measurement which gives a direct, continuous reading of the value measured.

DESCRIPTION OF THE PREFERRED EMBODIMENT

Figure 1:
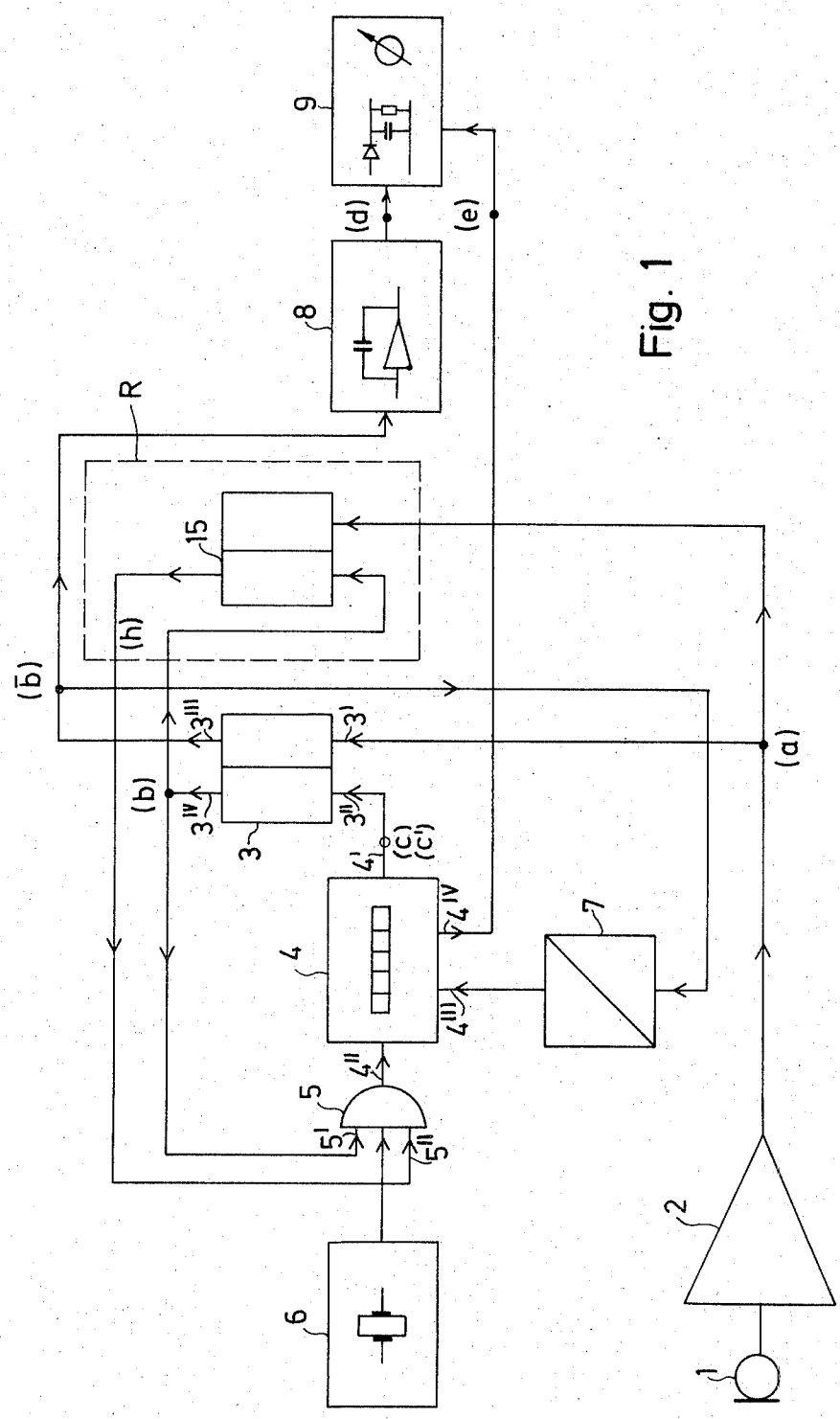
FIG. 1 is an overall schematic diagram of one embodiment of a device according to the invention for measuring the running rate and the guide mark of a clock movement.
Figure 2:
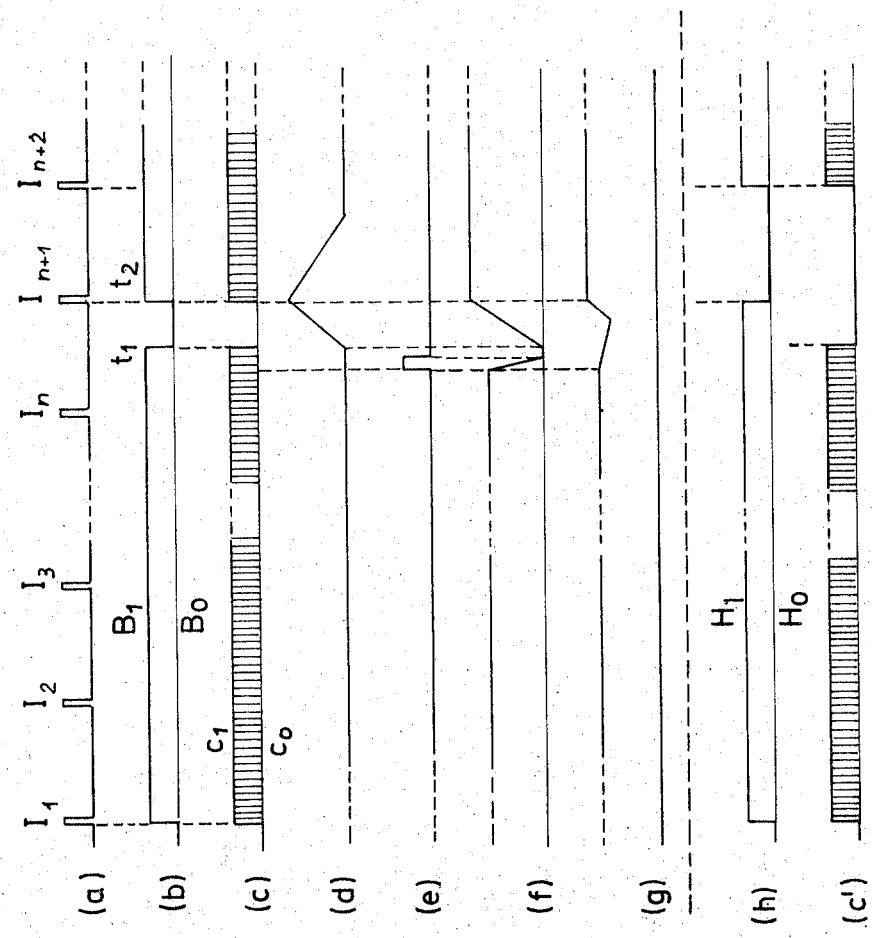
FIG. 2 is a diagram of signals appearing at different points in the diagram of the device of FIG. 1.

Referring now to FIG. 1, the vibrations of a clock movement produced by the beats of the escapement are picked up by a vibration detector 1 and are then amplified and shaped into measuring pulses by an amplifier 2. At the outlet of the amplifier 2, at the point designated (a), there appears a train of measuring pulses such as are shown in FIG. 2 at line (a). These measurement pulses (a) correspond to the beat produced at the start of each half-cycle of oscillation of the balance and their ascending flank coincides with the ascending flank of the train of pulses produced by the detector 1 upon a beat which is in fact constituted by a short series of vibrations.

For the measurement of the running rate of the clock movement, the device in accordance with FIG. 1 comprises the parts shown outside the block R drawn in dashed line, which is introduced into the circuit only for the measurement of the guide mark which will be described subsequently.

One input 3' of a bistable or flip-flop circuit 3 is connected to the output of the amplifier 2 and another input 3'' of the flip-flop 3 is connected to an output 4' of a pulse counter 4. The flip-flop circuit is of conventional construction and may be of a type that is commercially available or, if desired, may be constructed of discrete components as is well known by an electrical engineer having ordinary skill in the logic circuits arts, and as explained in the texts *Pulse and Digital Circuits* by Millman and Taub, McGraw-Hill Book Co., 1956, pages 156–161; and *General Electronics Circuits* By DeFrance, Holt, Rinehart and Winston, 1963, pages 429–431. An input 4'' of the pulse counter 4 is connected, via a logical coincidence circuit 5, with a chronometering pulse generator 6. The pulse generator 6 produces chronometering pulses which have a strictly constant repetition frequency which is obtained, for instance, by means of a quartz oscillator. The logical circuit 5 constitutes a gate for the chronometering pulses, this gate being controlled by the flip-flop 3 whose output $3^{IV}$ is connected to an input 5' of the circuit 5. The shape of the signal appearing at the output $3^{IV}$ or at the point in the diagram designated (b) is represented in line (b) in FIG. 2. This signal is produced in the following manner.

A first measurement pulse $I_1$ applied to the input 3' of the flip-flop 3 places this flip-flop in a condition $B_1$ which appears as corresponding signal $B_1$ at the output $3^{IV}$. This signal $B_1$ opens the gate 5 and therefore starts the counting of the chronometering pulses coming from the generator 6 by the counter 4. At the output of the counter 4, the signal $C_1$ shown at (c) of FIG. 2 appears. The signal $C_1$ holds the flip-flop 3 in a condition $B_1$ for the duration of the counting. The counter 4 is adapted to count a predetermined number of chronometering pulses and at the end of the counting period, that is to say at the moment $t_1$ indicated in FIG. 2, it returns to the condition $C_0$ which results in the appearance of an output signal $C_0$ represented at (c) in FIG. 2. The flip-flop 3 then returns to condition $B_0$ and again closes the gate 5.

The cycle described, triggered by the pulse $I_1$, starts again upon the arrival of the next measuring pulse $I_{n+1}$, at the moment $t_2$ indicated in FIG. 2.

At the output $3'''$ of the flip-flop 3 or at the point designated (b) in FIG. 1, a signal appears which is complementary to the signal of the output $3^{IV}$, that is to say $B_0$ during the counting interval and $B_1$ between the moments $t_1$ and $t_2$. The duration of this interval $t_1$, $t_2$ represents the difference between the interval separating the $(n + 1)$ measuring pulses and a reference time interval defined by the repetition frequency of the chronometering pulses and the number of these pulses which are counted.

For the measurement of the running rate of a clock, the reference interval is determined on the one hand in such a manner as to comprise an even number of measuring pulses ($n$ even) so that the duration of an entire number of complete oscillations of the balance is measured. Stated differently, the reference interval is longer than the greatest length, in the measurement range selected, of the interval between an even number of measuring pulses.

On the other hand, the reference interval is selected in such a manner that, for all the values of the running rate of the measurement range, the pulse $I_{n+1}$ appears after the time $t_1$. Thus the largest measurable gain of the watch corresponds to a duration $t_1$, $t_2$ minimum and the largest loss to a duration $t_1$, $t_2$ maximum, all the intervals $t_1$, $t_2$ being measured in the same direction. This is important for the indication of the values of the running rate which will be described further below.

Since for the number of vibrations more commonly used in clock movements, that is to say 14,400, 18,000, 19,800, 21,600, 28,800 vibrations per hour, the smallest common interval corresponding to an even number of half-vibrations is 4 seconds, the average measurement interval corresponding to a correct running rate of the movement is selected as equal to 4 seconds. For the numbers of vibrations mentioned, this measurement interval contains 16, 20, 22, 24 and 32 half-vibrations, respectively.

If it is desired to measure variations of the running rate of ± 20 seconds per day, this measurement range corresponds to a variation of the measurement interval of 4 seconds of ± 20 × 4 : 86,400 = 1 : 1,080 seconds.

In order that the duration $t_1$, $t_2$ obtained at the smallest value of the measurement interval results in a measurement value other than zero, the reference interval is selected in such a manner that it is less than the minimum duration of the measurement interval. In the case mentioned, this minimum duration is 4 − (1 : 1,080) seconds and the reference interval is selected, for instance, as equal to 4 − (1 : 900) seconds. In this example, the frequency of the quartz oscillator and therefore the repetition frequency of the chronometering pulses is 432 Hz. so that the counter 4 is adapted to count: 4 × 432,000 − (432,000 : 900) = 4 × 432,000 − 480 pulses. This is effected by preposting the number 480 in a counter which counts 4 × 432,000 pulses.

Furthemore, in a preferred embodiment, the preposting is adjustable, which makes it possible to select different measurement ranges. To each measurement range desired there corresponds a preposted number which is determined in a manner similar to the example described.

In the diagram of FIG. 1, the preposting of a desired preset number is effected at the end of a measurement interval by means of a monostable circuit 7 which is controlled from the output $3'''$ of the flip-flop 3 and having its output connected to an input $4'''$ of the counter 4. Once the gate 5 is closed, the counter 4 counts the chronometering pulses supplied thereto, commencing with the preset number.

Figure 3:
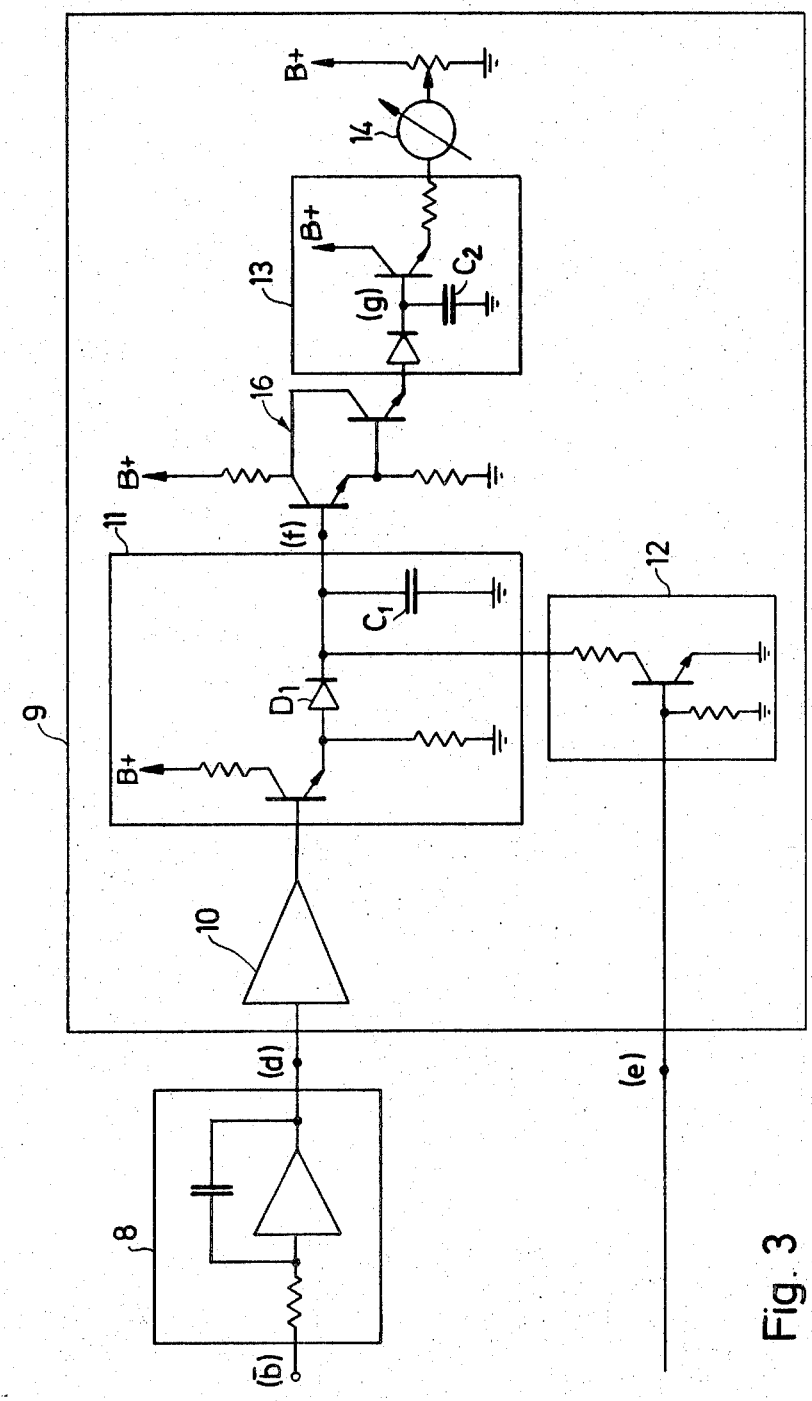
FIG. 3 is a simplified diagram of a part of the device of FIG. 1.

For the measurement and posting of the duration $t_1$, $t_2$, the pulse which appears at the output $3'''$ of the flip-flop 3 during this duration is applied to an integration circuit comprising an operational amplifier such as is shown in FIG. 3. The output signal of the integrator 8, at the point designated (d) in the diagram of FIGS. 1 and 3, is a triangular pulse represented on line (d) of FIG. 2. This pulse increases linearly between the times $t_1$ and $t_2$ and reaches a height proportional to the duration $t_1$, $t_2$. It is applied to a posting device 9 shown in greater detail in FIG. 3.

Referring now to FIG. 3, in the device 9, the output of the integrator 8 is connected via an amplifier 10 to a rectifier circuit 11 comprising a charge capacitor $C_1$. This capacitor is charged through a diode $D_1$ and the discharge time constant of the capacitor is selected very large as compared with the measurement interval. In the example described in which the measurement interval is about 4 seconds, this discharge time constant is 400 seconds.

The voltage appearing at the output designated in FIG. 3 as (f) in the circuit 11 thus constitutes a measurement value proportional to the duration of the interval $t_1$, $t_2$. In order to permit this voltage to follow a possible decrease in the duration $t_1$, $t_2$, for one measurement interval to the other, the device 9 includes a circuit 12 which discharges the capacitor $C_1$ very rapidly under the control of a pulse applied to its input designated (e). The input (e) is connected to the output $4^{IV}$ of the counter 4 which produces a pulse such as shown in line (e) of the diagram of FIG. 2 a few milliseconds before the end of each counting period. Thus the output voltage of the circuit 11 at the point (f) assumes the shape shown in line (f) of FIG. 2. Before the arrival of a new pulse at the point (d), the voltage (f) drops to zero and then rises with the ascending flank of the pulse (d) up to the maximum value of the latter.

The output (f) of the circuit 11 is connected, via a transistor amplifier 16, connected in Darlington fashion, to a second rectifier circuit 13 comprising a capacitor $C_2$. This capacitor is charged by the voltage (f) and controls the indication of a measuring instrument 14.

The discharge circuit of the capacitor $C_2$ has a time constant of the same order of magnitude as the duration of the measuring interval, that is to say, a few seconds, so that $C_2$ discharges only slightly upon the discharge of $C_1$ and resumes the value corresponding to the voltage at (f) at the end of the measurement interval. The variation of the potential at the point (g) is represented on line (g) of FIG. 2. As this potential controls the reading of the instrument 14, it is seen that the posting of the running rate of the watch is effected practically continuously.

The scale of the instrument is graduated, in the case of the measurement of the running rate, in units of time of gain or loss per day. It follows from the foregoing that the indication of the greatest gain of the measurement range corresponds to a minimum electric measurement value different from zero and that the other end of the scale corresponds to the maximum value of the measurement value, that is to say to the largest loss measurable within the selected measurement range.

For the measurement of the guide mark of a clock movement, that is to say the asymmetry which the durations of the half-oscillations of the balance may exhibit with respect to half the duration of the complete oscillation, a portion R corresponding to the diagram of FIG. 1 is connected to the device which has just been described and certain parameters of the circuit are modified, preferably by selecting predetermined values of circuit elements and preset counts conventionally obtained by simple switching techniques well-known to electrical engineers having ordinary skill in the electrical measuring arts.

Thus as the measurement must relate to an odd number of half-oscillations, the reference interval is determined in such a manner that the number of measurement pulses $n$ occurring during the counting period is an odd number. For the customary vibrations mentioned above, the following average measurement intervals, for instance, are selected:

| Vibrations per hour | Measurement intervals | Number of measurement pulses $n$ |
|---|---|---|
| 14,800 | ¼ sec | 1 |
| 18,000 | 1 sec | 5 |
| 19,800 | 2 sec | 11 |
| 21,600 | ½ sec | 3 |
| 28,800 | ⅛ sec | 1 |

The adjustable preposting effected by means of the monostable circuit 7 makes it possible to determine, for each of the different measurement intervals, the appropriate reference interval, giving intervals $t_1$, $t_2$ different from zero for the entire measurement range.

Moreover, in order to obtain an indication of the same direction in successive measurement intervals, these intervals are separated by the duration of a half-oscillation of the balance. In the diagram of FIG. 2, the line (c') shows the reference intervals or counting periods in the case of the measurement of the guide mark, the duration to be measured being always $t_1$, $t_2$ represented in the upper part of the diagram. The block R of the diagram of FIG. 1 comprises a flip-flop 15 similar to the flip-flop 3 whose inputs are connected with the output of the amplifier 2 and the output $3^{IV}$ of the flip-flop 3 respectively. The output signal of the flip-flop 15 of suitable polarity is applied to a third input of the coincidence circuit 5 designated by 5''. The condition $H_0$ being established at the point designated (h) between the moment $t_2$ when the last measurement pulse $I_{n+1}$ of a measurement interval occurs and the following pulse $I_{n+2}$, appears, line (h) of the diagram of FIG. 2, prevents the starting of a new counting by the pulse $I_{n+1}$. Therefore it is the pulse $I_{n+2}$ which marks the start of a half-oscillation of duration comparable to the one which is defined by $I_1$ and $I_2$ which, in the simultaneous presence of the conditions $B_1$ at 5' and $H_1$ at 5'', controls the opening of the gate 5.

The measuring device of the guide mark furthermore comprises a discrimination circuit (not shown) which makes it possible to determine the start of each measuring operation in such a manner that the first measurement interval commences each time with the longest half-oscillation of two successive half-oscillations.

The continuous posting on the instrument 14 of the duration $t_1$, $t_2$ is effected in the same manner as for the measurement of the running rate, the time constants of the integrator and, where applicable, of the discharge circuits being, of course, switched for the different measurement intervals so as to obtain an operation similar to that which has been described above. It should be noted that the duration $t_1$, $t_2$ which supplies a measurement of the guide mark depends also on the operating rate of the watch. However, for the customary measurement ranges, the influence of the running rate on the duration $t_1$, $t_2$ is negligible as compared with the guide mark.

In addition to the measurement of the running rate and of the guide mark of a watch, the process and the apparatus described can be used to measure other characteristic values, such as, for instance, the amplitude of the balance which results in a variation of the spacing between measuring pulses. In all cases the invention permits a direct, continuous posting of the value measured.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. The method of measuring a characteristic value of the operation of a clock movement, in which the vibrations produced by the beats of the escapement of the clock movement are detected and converted into electric measurement pulses, comprising the steps of counting in a counter, in successive measuring intervals, starting from a measuring pulse, a given number of chronometering pulses of constant repetition frequency, converting the duration of the time interval between the last chronometering pulse counted and the following measurement pulse into an electrical value and continuously posting the value of this electrical value.

2. The method according to claim 1 for measurement of the running rate of a clock movement, comprising the steps of counting a number of chronometering pulses in each measuring interval such that the duration of the counting is longer than the interval separating a given even number of measuring pulses and shorter than the interval separating a number of pulses equal to the odd number following the even number for all values of the latter interval which may occur in a given measurement range.

3. The method according to claim 1 for the measurement of the guide mark of a clock movement, comprising the steps of counting, in each measurement interval, a number of chronometering pulses such that the duration of the counting is longer than the interval separating a given odd number of measuring pulses and shorter than the interval separating a number of pulses equal to the even number following the odd number for all values of the latter interval which may occur in a given measurement range.

4. The method according to claim 1 for measuring the guide mark of a clock movement, comprising the steps of counting, in each measurement interval, a number of chronometering pulses such that the duration of the counting is shorter than the interval between two successive pulses for all values of said interval which may occur in a given measurement range.

5. The method according to claim 1 for measuring the guide mark of a clock movement comprising the steps of starting the counting in successive measuring intervals by the second measurement pulse appearing after the end of the preceding counting period.

6. The method according to claim 1, further comprising the steps of preposting, for each desired measurement range, in the counter, a number of pulses greater than the number which corresponds to half of the measurement range.

7. The method of measurement according to claim 1, comprising the steps of storing the electric value in a circuit having a discharge time constant much greater than the duration of the measurement interval, discharging the circuit rapidly before the end of a counting period and storing the condition of charge of the first circuit in a second circuit having a discharge time constant of the order of magnitude of the measurement interval, and controlling the reading of the measuring instrument by the condition of charge of the latter circuit.

8. Apparatus for measuring a characteristic value of the operation of a clock movement, in which the vibrations produced by the beats of the escapement of the clock movement are detected and converted into electric measurement pulses, comprising a vibration detector which supplies the measurement pulses, a chronometering pulse generator, a chronometering pulse counter adapted to count a given number of pulses, supply means for selectively supplying said chronometering pulses to said pulse counter, a controlled preposting circuit connected to the counter, switch means having an input connected to the pulse counter, and an input connected to the vibration detector for switching between first and second states when said given number of pulses has been counted and when a measurement pulse is supplied, said switch means controlling the preposting circuit and the supply means, a posting device, and a time-amplitude converter connected between the switch means and the posting device.

9. Apparatus according to claim 8 comprising means for preposting in the counter, for each desired measurement range, a number of pulses greater than the number which corresponds to half of the measurement range.

10. Apparatus according to claim 8 for the measurement of the guide mark of a clock movement, further comprising additional switch means having an input connected to the vibration detector and an input connected to the first-mentioned switch means, the additional switch means detecting the duration between successive measurement pulses for controlling the supply means.

11. Apparatus according to claim 8, wherein the posting device comprises a first rectifier circuit, the first rectifier circuit including a first capacitor connected in the first rectifier circuit in such a manner that it has a very large discharge time constant as compared with the duration of the measurement interval and a circuit responsive to a pulse coming from the counter for the rapid discharge of the first capacitor, a second rectifier circuit, a separation stage for connecting the first rectifier circuit to the second rectifier circuit, the second rectifier circuit including a second capacitor, a discharge circuit for the second capacitor having a time constant of the order of magnitude of the measurement interval, and a measuring instrument controlled by the charge of the second capacitor.

12. Apparatus according to claim 8 wherein the supply means comprises a logic gate and wherein the switch means comprises a first flip-flop circuit having a first input connected to the output of the pulse counter, a second input connected to the vibration detector, a first output connected to the preposting circuit and a second output connected to the logic gate.

13. Apparatus according to claim 12 for the measurement of the guide mark of a clock movement, further comprising a second flip-flop circuit having a first input connected to the vibration detector, a second input connected to the second output of the first flip-flop circuit and an output connected to the logic gate.

* * * * *